(12) United States Patent
Lin et al.

(10) Patent No.: US 11,260,633 B2
(45) Date of Patent: Mar. 1, 2022

(54) MULTILAYER FILMS, ARTICLES COMPRISING THE SAME, METHODS OF MANUFACTURING MULTILAYER FILMS

(71) Applicant: Dow Global Technologies LLC, Midland, MI (US)

(72) Inventors: Yijian Lin, Manvel, TX (US); Wenyi Huang, Midland, MI (US); Selim Bensason, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 299 days.

(21) Appl. No.: 16/094,619

(22) PCT Filed: Jun. 28, 2017

(86) PCT No.: PCT/US2017/039619
§ 371 (c)(1),
(2) Date: Oct. 18, 2018

(87) PCT Pub. No.: WO2018/005577
PCT Pub. Date: Jan. 4, 2018

(65) Prior Publication Data
US 2019/0126598 A1 May 2, 2019

Related U.S. Application Data

(60) Provisional application No. 62/355,407, filed on Jun. 28, 2016.

(51) Int. Cl.
| | | |
|---|---|---|
| *B32B 27/08* | (2006.01) | |
| *B32B 27/28* | (2006.01) | |
| *B32B 27/30* | (2006.01) | |
| *B32B 27/32* | (2006.01) | |
| *B32B 38/00* | (2006.01) | |
| *B32B 7/035* | (2019.01) | |
| *B65D 65/40* | (2006.01) | |
| *B32B 27/20* | (2006.01) | |
| *B32B 27/34* | (2006.01) | |
| *B32B 7/02* | (2019.01) | |

(52) U.S. Cl.
CPC ............... *B32B 27/08* (2013.01); *B32B 7/02* (2013.01); *B32B 7/035* (2019.01); *B32B 27/20* (2013.01); *B32B 27/285* (2013.01); *B32B 27/306* (2013.01); *B32B 27/32* (2013.01); *B32B 27/34* (2013.01); *B32B 38/0012* (2013.01); *B65D 65/40* (2013.01); *B32B 2038/0028* (2013.01); *B32B 2250/05* (2013.01); *B32B 2250/40* (2013.01); *B32B 2264/104* (2013.01); *B32B 2270/00* (2013.01); *B32B 2274/00* (2013.01); *B32B 2307/516* (2013.01); *B32B 2307/724* (2013.01); *B32B 2439/40* (2013.01); *B32B 2439/70* (2013.01)

(58) Field of Classification Search
CPC ......... B32B 27/08; B32B 27/20; B32B 27/34; B32B 7/02; B32B 7/035; B32B 38/0012; B32B 27/285; B32B 27/306; B32B 27/32; B32B 2264/104; B32B 2270/00; B32B 2274/00; B32B 2307/516; B32B 2439/40; B32B 2038/0028; B32B 2250/05; B32B 2250/40; B32B 2307/724; B32B 2439/70; B32B 2250/03; B32B 2250/04; B32B 38/0036; B32B 38/0048; B65D 65/40
USPC ... 428/339, 220, 480, 212, 432.2, 337, 42.1, 428/515, 35.7, 516; 264/288.4, 29.7
See application file for complete search history.

(56) References Cited

U.S. PATENT DOCUMENTS

| | | |
|---|---|---|
| 3,843,761 A | 10/1974 | Bierenbaum et al. |
| 4,620,956 A | 11/1986 | Hamer |
| 5,160,768 A | 11/1992 | Antoon, Jr. |
| 6,294,210 B1 | 9/2001 | Kuo |
| 6,376,032 B1 | 4/2002 | Clarke et al. |
| 6,461,702 B2 | 10/2002 | Gong |
| 7,083,837 B1 | 8/2006 | Varriano-Marston |
| 8,372,783 B2 | 2/2013 | Chandra et al. |
| 2004/0191476 A1 | 9/2004 | Wallen et al. |
| 2005/0277702 A1 | 12/2005 | Lee et al. |

(Continued)

FOREIGN PATENT DOCUMENTS

| | | |
|---|---|---|
| EP | 744434 | 11/1996 |
| EP | 1098569 | 5/2001 |

(Continued)

OTHER PUBLICATIONS

Dow Chemical (UNIVAL DMDA-6400 NT 7, High Density Polyethylene Resin, Published Apr. 25, 2006, p. 1-3) (Year: 2006).*

(Continued)

*Primary Examiner* — Lee E Sanderson

(57) ABSTRACT

The present invention provides multilayer films, packages formed from such films, and methods of making multilayer films. In one aspect, a multilayer film comprises multilayer film comprising at least 3 layers, each layer having opposing facial surfaces and arranged in the order A/B/C, wherein a top facial surface of Layer B is in adhering contact with a bottom facial surface of Layer A; wherein a top facial surface of Layer C is in adhering contact with a bottom facial surface of Layer B, wherein the film is oriented in the machine direction and wherein the film exhibits a normalized carbon dioxide transmission rate of at least 3000 $cm^3 \cdot mil/100\ in^2/day$, and wherein the film exhibits a ratio of the carbon dioxide transmission rate to an oxygen transmission rate of at least 4.0.

14 Claims, No Drawings

(56) References Cited

U.S. PATENT DOCUMENTS

| | | |
|---|---|---|
| 2008/0178768 A1 | 7/2008 | Breese |
| 2011/0293802 A1 | 12/2011 | Alfaro et al. |
| 2014/0075895 A1 | 3/2014 | O'Connor |
| 2014/0377416 A1 | 12/2014 | Clarke |
| 2015/0033669 A1 | 2/2015 | Dobreski et al. |
| 2015/0079252 A1 | 3/2015 | Jeong et al. |
| 2015/0104627 A1* | 4/2015 | O'Donnell ............ B32B 27/306 428/216 |
| 2016/0325486 A1* | 11/2016 | McLeod .................... C08J 5/18 |
| 2018/0178768 A1 | 6/2018 | Ono et al. |

FOREIGN PATENT DOCUMENTS

| | | |
|---|---|---|
| EP | 1215229 | 6/2002 |
| WO | 2016/033034 | 3/2016 |

OTHER PUBLICATIONS

PCT/US2017/039619, International Search Report and Written Opinion dated Sep. 13, 2017.
PCT/US2017/039619, International Preliminary Report on Patentability dated Jan. 1, 2019.

* cited by examiner

MULTILAYER FILMS, ARTICLES COMPRISING THE SAME, METHODS OF MANUFACTURING MULTILAYER FILMS

FIELD

The present invention relates to multilayer films and in particular, to multilayer films oriented at least in the machine direction. Such films can be particularly useful in articles such as flexible packaging. The present invention also relates to methods of manufacturing multilayer films.

INTRODUCTION

Improving the quality and the shelf life of fresh produce and fresh cut produce has long been an objective of the food industry. Technologies such as controlled atmosphere storage (CA), modified atmosphere packaging (MAP), and ripening control technologies such as ethylene absorbers and ethylene antagonists (1-MCP) have been developed and are selectively used to achieve extended produce shelf life and improved produce quality. Understanding of biological variation such as fruit type, variety, maturity, growing region, and climatic response are important when selecting the appropriate technology for packaging, storing, and transporting produce.

Most produce incurs significant damage from fungus and mold when the moisture level inside a package is too high and condensation occurs. Most produce incurs significant damage when the moisture level inside a package is too low and dehydration, resulting in shrivel, occurs. Most produce generates carbon dioxide ($CO_2$) as it ripens and consumes oxygen ($O_2$). Most produce incurs damage when the $CO_2$ level in the package becomes too high (typically above 5%). For certain kinds of fruits and vegetables, a higher transmission rate ratio of $CO_2/O_2$ is preferred to get a desired atmosphere environment inside the package. At the same time, for certain kinds of fruits and vegetables, high $CO_2$ and $O_2$ transmission rates are also desired. Often, polymers having a high $CO_2/O_2$ selectivity ratio (e.g., EVA, polyether block amide, etc.) do not have enough mechanical strength to be provided as a single layer film. While such polymers can be incorporated into multilayer films, it becomes difficult to maintain the desired $CO_2/O_2$ selectivity when additional layers are included.

Thus, a need exists for a film having desired transmission rates for $CO_2$ and $O_2$ while maintaining a desired $CO_2/O_2$ transmission rate ratio that is suitable for produce packaging applications. A need further exists for a produce packaging film with suitable transmission properties that can enable the benefits of the MAP environment.

SUMMARY

The present disclosure provides a multilayer film that provides desirable $CO_2$ and $O_2$ transmission rates while also having adequate mechanical strength. In some embodiments, multilayer films of the present invention exhibit a ratio of carbon dioxide transmission rate ratio to oxygen transmission rate that is desirable for produce packaging applications.

In one aspect, the present invention provides a multilayer film that comprises at least 3 layers, each layer having opposing facial surfaces and arranged in the order A/B/C, wherein Layer A comprises a high density polyethylene having a $M_{w,cc}/M_{n,cc}$ of at least 6.0, a $M_{z,abs}$ of at least 500,000 grams/mol as measured by triple detector GPC, and a density of ~0.957-0.970 $g/cm^3$, wherein the high density polyethylene comprises at least 90 percent by weight of Layer A; Layer B comprises a gas permeation layer, wherein a top facial surface of Layer B is in adhering contact with a bottom facial surface of Layer A; and Layer C comprises a high density polyethylene having a $M_{w,cc}/M_{n,cc}$ of at least 6.0, a $M_{z,abs}$ of at least 500,000 grams/mol as measured by triple detector GPC, and a density of 0.957-0.970 $g/cm^3$, wherein the high density polyethylene comprises at least 90 percent by weight of Layer C and wherein a top facial surface of Layer C is in adhering contact with a bottom facial surface of Layer B, wherein the film is oriented in the machine direction and wherein the film exhibits a normalized carbon dioxide transmission rate of at least 3000 $cm^3 \cdot mil/100\ in^2/day$ when measured according to ASTM F-2476 at 23° C., 0% relative humidity, and 1 atm, and wherein the film exhibits a ratio of the carbon dioxide transmission rate to an oxygen transmission rate of at least 4.0, when the oxygen transmission rate is measured according to ASTM D3985 at 23° C., 0% relative humidity, and 1 atm.

Embodiments of the present invention also provide articles (e.g., flexible packages, pouches, stand-up pouches, etc.) formed from the films disclosed herein.

Embodiments of the present invention also relate to methods of manufacturing multilayer films. In one embodiment, a method of manufacturing a multilayer film comprises providing a film comprising at least 3 layers, each layer having opposing facial surfaces and arranged in the order A/B/C, wherein Layer A comprises a high density polyethylene having a $M_{w,cc}/M_{n,cc}$ of at least 6.0, a $M_{z,abs}$ of at least 500,000 grams/mol as measured by triple detector GPC, and a density of 0.957-0.970 $g/cm^3$, wherein the high density polyethylene comprises at least 90 percent by weight of Layer A; Layer B comprises a gas permeation layer, wherein a top facial surface of Layer B is in adhering contact with a bottom facial surface of Layer A; and layer C comprises a high density polyethylene having a $M_{w,cc}/M_{n,cc}$ of at least 6.0, a $M_{z,abs}$ of at least 500,000 grams/mol as measured by triple detector GPC, and a density of 0.957-0.970 $g/cm^3$, wherein the high density polyethylene comprises at least 90 percent by weight of Layer C and wherein a top facial surface of Layer C is in adhering contact with a bottom facial surface of Layer B; cold stretching the film in the machine direction to a cold stretch percentage, $$\frac{\text{Total Length after Cold Stretching} - \text{Original Film Length}}{\text{Original Film Length}} \times 100\%,$$

of from 25% to 150% at a temperature ranging from 10° C. to 50° C.; and after the cold stretch, hot stretching the film in the machine direction to a hot stretch percentage, $$\frac{\text{Total Length after Hot Stretching} - \text{Total Length after Cold Stretching}}{\text{Original Film Length}} \times 100\%,$$

of from 50% to 500% at a temperature ranging from 90° C. to 110° C.

These and other embodiments are described in more detail in the Detailed Description.

DETAILED DESCRIPTION

Unless specified otherwise herein, percentages are weight percentages (wt %) and temperatures are in ° C.

The term "composition," as used herein, includes material(s) which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within the polymer.

The term "interpolymer," as used herein, refers to a polymer prepared by the polymerization of at least two different types of monomers. The generic term interpolymer thus includes copolymers (employed to refer to polymers prepared from two different types of monomers), and polymers prepared from more than two different types of monomers. The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers.

"Polyethylene" or "ethylene-based polymer" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). These polyethylene materials are generally known in the art; however the following descriptions may be helpful in understanding the differences between some of these different polyethylene resins.

The term, "propylene-based polymer," as used herein, refers to a polymer that comprises, in polymerized form, a majority amount of propylene monomer (based on the weight of the polymer), and optionally may comprise one or more comonomers.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). The LLDPEs can be made via gas-phase, solution-phase or slurry polymerization or any combination thereof, using any type of reactor or reactor configuration known in the art, with gas and slurry phase reactors being most preferred.

The term "MDPE" refers to polyethylenes having densities from 0.926 to 0.935 g/cm$^3$. "MDPE" is typically made using chromium or Ziegler-Natta catalysts or using single-site catalysts including, but not limited to, bis-metallocene catalysts and constrained geometry catalysts, and typically have a molecular weight distribution ("MWD") greater than 2.5.

The term "HDPE" refers to polyethylenes having densities greater than about 0.935 g/cm$^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm$^3$, which are generally prepared with Ziegler-Natta catalysts, chrome catalysts, or single-site catalysts including, but not limited to, bis-metallocene catalysts and constrained geometry catalysts.

"Multimodal" means resin compositions which can be characterized by having at least two distinct peaks in a GPC chromatogram showing the molecular weight distribution. Multimodal includes resins having two peaks as well as resins having more than two peaks. Multimodal resins generally have a MWD (as defined herein) of greater than 6.0. Related thereto, multimodal resins also generally have $I_{10}/I_2$ values greater than 10. In contrast, the term "unimodal" refers to resin compositions which can be characterized by having one peak in a GPC chromatogram showing the molecular weight distribution. Unimodal resins generally have a MWD of 6.0 or less and $I_{10}/I_2$ values of 12 or less.

Certain polymers are characterized as being prepared in the presence of a "single-site catalyst" or as being "single-site catalyzed." Three major families of high efficiency single-site catalysts (SSC) have been commercially used for the preparation of polyethylene copolymers. These are bis-cyclopentadienyl single-site metallocene catalyst (also known as a Kaminsky catalyst), a half sandwich, constrained geometry mono-cyclopentadienyl single-site catalyst (known as a Constrained Geometry Catalyst, CGC, under the trademark of INSITE™ technology by The Dow Chemical Company), and post-metallocene catalysts. It should be understood that polymers characterized as being prepared in the presence of a single-site catalyst or as single-site catalyzed were prepared in the presence of one or more of such catalysts.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

The term "in adhering contact" and like terms mean that one facial surface of one layer and one facial surface of another layer are in touching and binding contact to one another such that one layer cannot be removed for the other layer without damage to the in-contact facial surfaces of both layers.

In one embodiment, a multilayer film of the present invention comprises at least 3 layers, each layer having opposing facial surfaces and arranged in the order A/B/C, wherein Layer A comprises a high density polyethylene having a $M_{w,cc}/M_{n,cc}$ of at least 6.0, a $M_{z,abs}$ of at least 500,000 grams/mol as measured by triple detector GPC, and a density of 0.957-0.970 g/cm$^3$, wherein the high density polyethylene comprises at least 90 percent by weight of Layer A; Layer B comprises a gas permeation layer, wherein a top facial surface of Layer B is in adhering contact with a bottom facial surface of Layer A; and Layer C comprises a high density polyethylene having a $M_{w,cc}/M_{n,cc}$ of at least 6.0, a $M_{z,abs}$ of at least 500,000 grams/mol as measured by triple detector GPC, and a density of 0.957-0.970 g/cm$^3$, wherein the high density polyethylene comprises at least 90 percent by weight of Layer C and wherein a top facial surface of Layer C is in adhering contact with a bottom facial surface of Layer B, wherein the film is oriented in the machine direction and wherein the film exhibits a normalized carbon dioxide transmission rate of at least 3000 cm$^3$·mil/100 in$^2$/day when measured according to ASTM F-2476 at 23° C., 0% relative humidity, and 1 atm, and wherein the film exhibits a ratio of the carbon dioxide transmission rate to an oxygen transmission rate of at least 4.0, when the oxygen transmission rate is measured according to ASTM D3985 at 23° C., 0% relative humidity, and 1 atm.

In some embodiments, the oxygen and carbon dioxide transmission rates of Layer B are less than the oxygen and carbon dioxide transmission rates of Layer A and Layer C.

In some embodiments, the gas permeation layer comprises polyether block amide, poly(ethylene-vinyl acetate), a propylene-based olefin block copolymer, a polyolefin plastomer, a polyolefin elastomer, or combinations thereof.

In some embodiments, Layer A and Layer C have the same composition.

In some embodiments, a multilayer film further comprises Layer D and Layer E, wherein a top facial surface of Layer D is in adhering contact with a bottom facial surface of Layer C, wherein a top facial surface of Layer E is in adhering contact with a bottom facial surface of Layer D, wherein Layer D comprises a gas permeation layer. In a further embodiment, Layer E has the same composition has Layer A, and/or Layers B and D have the same composition.

Regarding orientation of the film in the machine direction, in some embodiments, the film is cold stretched in the machine direction, and after the cold stretch, the film is hot stretched in the machine direction. During the cold stretch, in some embodiments, the cold stretch percentage:

$$\frac{\text{Total Length after Cold Stretching} - \text{Original Film Length}}{\text{Original Film Length}} \times 100\%,$$

is from 25% to 150%. In some embodiments, the cold stretch is performed at a temperature ranging from 10° C. to 50° C. During the hot stretch, in some embodiments, the hot stretch percentage:

$$\frac{\text{Total Length after Hot Stretching} - \text{Total Length after Cold Stretching}}{\text{Original Film Length}} \times 100\%,$$

is from 50% to 500%. In some embodiments, the hot stretch is performed at a temperature ranging from 90° C. to 110° C.

In some embodiments, the film is uniaxially oriented (e.g., oriented in the machine direction only).

In some embodiments, the film is also oriented in the transverse or cross direction. During the cold stretch in the cross direction, in some embodiments, the cold stretch percentage:

$$\frac{\text{Total Length after Cold Stretching} - \text{Original Film Length}}{\text{Original Film Length}} \times 100\%,$$

is from 25% to 150%. In some embodiments, the cold stretch is performed at a temperature ranging from 10° C. to 50° C. During the hot stretch in the cross direction, in some embodiments, the hot stretch percentage:

$$\frac{\text{Total Length after Hot Stretching} - \text{Total Length after Cold Stretching}}{\text{Original Film Length}} \times 100\%,$$

is from 50% to 500%. In some embodiments, the hot stretch is performed at a temperature ranging from 90° C. to 110° C.

In some embodiments, Layer A comprises at least 10% by weight of the multilayer film based on the total weight of the film. Layer A comprises at least 30% by weight of the multilayer film based on the total weight of the film in some embodiments.

Layer A, in some embodiments, comprises at least 90% by weight of the high density polyethylene based on the total weight of Layer A.

In some embodiments, Layer C comprises at least 10% by weight of the multilayer film based on the total weight of the film. Layer C comprises at least 30% by weight of the multilayer film based on the total weight of the film.

Layer C, in some embodiments, comprises at least 90% by weight of the high density polyethylene based on the total weight of Layer C.

Layer B, in some embodiments, comprises 1% to 80% by weight of the multilayer film based on the total weight of the film. In some embodiments, Layer B comprises 5% to 60% by weight of the multilayer film based on the total weight of the film. Layer B comprises 10% to 40% by weight of the multilayer film based on the total weight of the film in some embodiments.

In some embodiments, Layer A and Layer C each comprise less than 10 weight percent $CaCO_3$. Layer A and Layer C, in some embodiments, each comprise less than 5 weight percent $CaCO_3$. Layer A and Layer C each comprise less than 2 weight percent $CaCO_3$ in some embodiments. Layer A and Layer C, in some embodiments, each comprise less than 1 weight percent $CaCO_3$. In some embodiments, Layer A and Layer C do not comprise $CaCO_3$.

In some embodiments, a multilayer film of the present invention exhibits an oxygen transmission rate of 500 $cm^3 \cdot mil/100$ $in^2/day$ or more when measured according to ASTM D3985 at 23° C., 0% relative humidity and 1 atm.

In some embodiments, the ratio of carbon dioxide transmission rate to oxygen transmission rate in the film is greater than 5. The ratio of carbon dioxide transmission rate to oxygen transmission rate of the film, in some embodiments, is greater than 7.

Some embodiments of the present invention relate to a package comprising any of the multilayer films disclosed herein. In some embodiments, the package is a food package.

Some embodiments of the present invention relate to methods of manufacturing multilayer films. In some embodiments, a method of manufacturing a multilayer film comprises providing a film comprising at least 3 layers, each layer having opposing facial surfaces and arranged in the order A/B/C, wherein Layer A comprises a high density polyethylene having a $M_{w,cc}/M_{n,cc}$ of at least 6.0, a $M_{z,abs}$ of at least 500,000 grams/mol as measured by triple detector GPC, and a density of 0.957-0.970 $g/cm^3$, wherein the high density polyethylene comprises at least 90 percent by weight of Layer A; Layer B comprises a gas permeation layer, wherein a top facial surface of Layer B is in adhering contact with a bottom facial surface of Layer A; and layer C comprises a high density polyethylene having a $M_{w,cc}/M_{n,cc}$ of at least 6.0, a $M_{z,abs}$ of at least 500,000 grams/mol as measured by triple detector GPC, and a density of 0.957-0.970 $g/cm^3$, wherein the high density polyethylene comprises at least 90 percent by weight of Layer C and wherein a top facial surface of Layer C is in adhering contact with a bottom facial surface of Layer B; cold stretching the film in the machine direction to a cold stretch percentage, $$\frac{\text{Total Length after Cold Stretching} - \text{Original Film Length}}{\text{Original Film Length}} \times 100\%,$$

of from 25% to 150% at a temperature ranging from 10° C. to 50° C.; and after the cold stretch, hot stretching the film in the machine direction to a hot stretch percentage, $$\frac{\text{Total Length after Hot Stretching} - \text{Total Length after Cold Stretching}}{\text{Original Film Length}} \times 100\%,$$

of from 50% to 500% at a temperature ranging from 90° C. to 110° C.

Turning now to the components of different layers in various embodiments of multilayer films of the present invention, Layers A and C each contain at least 90 weight percent high density polyethylene (HDPE) based on the weight of the respective layer. In some embodiments, Layers A and C can comprise the same HDPE, although in other embodiments, Layer C can comprise a different HDPE from Layer A. In some embodiments, Layers A and C can have the same composition.

The density of the HDPE used in Layers A and C will typically be in the range of 0.957 $g/cm^3$ to 0.970 $g/cm^3$. All individual values and subranges of 0.957 $g/cm^3$ or greater are included and disclosed herein; for example the density of the polyethylene can be equal to or greater than 0.960 $g/cm^3$, or in the alternative, equal to or greater than 0.962 $g/cm^3$, or in the alternative, equal to or greater than 0.963 $g/cm^3$, or in the alternative, equal to or greater than 0.964 $g/cm^3$. In a particular embodiment, the HDPE has a density equal or less than 0.970 $g/cm^3$. All individual values and subranges from equal to or less than 0.970 $g/cm^3$ are included and disclosed herein. For example, the density of the HDPE can be equal to or less than 0.968 $g/cm^3$ in some embodiments.

The HDPE used in Layer A and Layer C has a $M_{w,cc}/M_{n,cc}$ (measured as described below) of at least 6.0. In some embodiments, the HDPE used in Layer A and C can have a $M_{w,cc}/M_{n,cc}$ of at least 7.0. The HDPE used in Layer A and C, in some embodiments, can have a $M_{w,cc}/M_{n,cc}$ of at least 8.0. In some embodiments, the HDPE used in Layer A and Layer C can have a $M_{w,cc}/M_{n,cc}$ of up to 15.

The HDPE used in Layer A and Layer C has a $M_{z,abs}$ (measured as described below) of at least 500,000 grams/mol. In some embodiments, the HDPE used in Layer A and C can have a $M_{z,abs}$ of at least 600,000 grams/mol. The HDPE used in Layer A and C, in some embodiments, can have a $M_{z,abs}$ of at least 700,000 grams/mol. In some embodiments, the HDPE used in Layer A and C can have a $M_{z,abs}$ of up to 2,000,000 grams/mol. The HDPE used in Layer A and C, in some embodiments, can have a $M_{z,abs}$ of up to 1,500,000 grams/mol.

In some embodiments, the HDPE has a melt index ($I_2$) of 20 g/10 minutes or less. All individual values and subranges up to 20 g/10 minutes are included herein and disclosed herein. For example, the HDPE can have a melt index from a lower limit of 0.1, 0.2, 0.25, 0.5, 0.75, 1, 2, 4, 5, 10 or 15 g/10 minutes to an upper limit of 1, 2, 4, 5, 10, or 15 g/10 minutes. The HDPE has a melt index ($I_2$) of up to 5 g/10 minutes in some embodiments. The HDPE has a melt index ($I_2$) of up to 2 g/10 minutes in some embodiments. In some embodiments, the HDPE has a melt index ($I_2$) less than 1 g/10 minutes.

Examples of commercially available HDPE that can be used in embodiments of the present invention include DOW™ HDPE resins, UNIVAL™ DMDA-6400, UNIVAL™ DMDA-6200, and ELITE™ 5960G, as well as other as other high density polyethylenes, which are commercially available from The Dow Chemical Company.

Layers A and C each comprise at least 90 weight percent high density polyethylene based on the weight of the layer. In some embodiments, Layer A and/or Layer C each comprise at least 95 weight percent high density polyethylene based on the weight of the layer. Layer A and/or Layer C each comprise at least 98 weight percent high density polyethylene based on the weight of the layer in some embodiments. In some embodiments, Layer A and/or Layer C each comprise at least 99 weight percent high density polyethylene based on the weight of the layer. Layer A and/or Layer C comprise substantially all high density polyethylene based on the weight of the layer, in some embodiments. All individual values and subranges from 90 to 100 wt % are included and disclosed herein; for example, the amount of high density polyethylene in Layer A and/or Layer C can be from a lower limit of 90, 91, 92, 93, 94, 95, 96, 97, 98, or 99 wt % to an upper limit of 94, 95, 96, 97, 98, 99, or 100 wt %.

In some embodiments, in addition to high density polyethylene, Layer A and/or Layer C can further comprise additional polyethylene. In general, in such embodiments, Layer A and/or Layer C can comprise any polyethylene known to those of skill in the art. For example, the polyethylene optionally used in Layer A and/or Layer C can be selected from ultralow density polyethylene (ULDPE), low density polyethylene (LDPE), linear low density polyethylene (LLDPE), medium density polyethylene (MDPE), ethylene-propylene copolymers, polyolefin plastomers, and combinations thereof. In such embodiments where Layer A and/or Layer C comprise HDPE and additional polyethylene, Layer A and/or Layer C comprises 10 weight percent or less of the additional polyethylene based on the total weight of the layer, or in the alternative, less than 5 weight percent of the additional polyethylene, or in the alternative, less than 4 weight percent, or in the alternative, less than 3 weight percent, or in the alternative, less than 2 weight percent.

In some embodiments, Layer A and/or Layer C can further comprise one or more additives known to those of skill in the art including, for example, antioxidants, colorants, slip agents, antiblocks, processing aids, nucleating agents, and combinations thereof. In some embodiments, Layer A and/or Layer C comprise up to 5 weight percent of such additives. All individual values and subranges from 0 to 5 wt % are included and disclosed herein; for example, the total amount of additives in Layer A and/or Layer C can be from a lower limit of 0.5, 1, 1.5, 2, 2.5, 3, 3.5, 4, or 4.5 wt % to an upper limit of 1, 2, 3, 4, or 5 wt %.

The thicknesses of Layer A and Layer C can vary depending on a number of factors including, for example, the composition of Layer B (the gas permeation layer), the thickness of Layer B, the thickness of any other layers in the multilayer film, the desired overall thickness of the multilayer film, the intended use of the multilayer film, the food or other item to be packaged when the film is to be used in packaging applications and other factors. The contribution of Layer A and Layer C to the overall thickness of the multilayer film can be characterized in term of weight percentage. In some embodiments, Layer A comprises at least 10% by weight of the multilayer film based on the total weight of the film. Layer A, in some embodiments, comprises at least 30% by weight of the multilayer film based on the total weight of the film. In some embodiments, Layer A comprises up to 90% by weight of the multilayer film based on the total weight of the film. For example, in a three layer film (A/B/C), Layer A can comprise 90% by weight of the film with Layers B and C each comprising 5% by weight. Layer A comprises up to 80% by weight of the multilayer film based on the total weight of the film, in some embodiments. For example, in a three layer film (A/B/C), Layer A can comprise 80% by weight of the film with Layers B and C each comprising 10% by weight. In some embodiments, Layer A comprises up to 60% by weight of the multilayer film based on the total weight of the film. For example, in a three layer film (A/B/C), Layer A can comprise 60% by weight of the film with Layers B and C each comprising 20% by weight. In some embodiments, Layer A comprises up to 49% by weight of the multilayer film based on the total weight of the film. Layer A, in some embodiments, comprises up to 45% by weight of the multilayer film based on the total weight of the film.

In some embodiments, Layer C comprises at least 10% by weight of the multilayer film based on the total weight of the film. Layer C, in some embodiments, comprises at least 30% by weight of the multilayer film based on the total weight of the film. In some embodiments, Layer C comprises up to 49% by weight of the multilayer film based on the total weight of the film. Layer C, in some embodiments, comprises up to 45% by weight of the multilayer film based on the total weight of the film.

Layer A and Layer C each have a top facial surface and a bottom facial surface. Layer B is positioned between Layers A and C and includes a top facial surface a bottom facial surface that are each in adhering contact with a facial surface of Layer A and a facial surface of Layer C. For example, in an A/B/C film arrangement, a top facial surface of Layer B is in adhering contact with a bottom facial surface of Layer A, and a bottom facial surface of Layer B is in adhering contact with a top facial surface of Layer C.

Layer B is a gas permeation layer. Gas permeation layers, in general, control the passage of oxygen ($O_2$) and carbon dioxide ($CO_2$), or other gases, through a film. For example, in the context of a food package, it may be desirable to control the rates at which $O_2$ and $CO_2$ enter/leave a package, as well as the relative transmission rates. The relative transmission rates of $O_2$ and $CO_2$ can be particularly important for certain foods (e.g., fruits and vegetables) in order provide a desired atmosphere environment inside the package. As used herein, a "gas permeation layer" has a carbon dioxide transmission rate of at least 500 $cm^3 \cdot mil/100\ in^2$/day when measured according to ASTM F-2476 at 23° C., 0% relative humidity, and 1 atm and an oxygen transmission rate of at least 100 $cm^3 \cdot mil/100\ in^2$/day when measured according to ASTM F-2476 at 23° C., 0% relative humidity, and 1 atm.

Persons of skill in the art can identify suitable gas permeation layers based on the teachings herein and depending on factors that can include, without limitation, desired carbon dioxide transmission rate, desired oxygen transmission rate, desired $CO_2/O_2$ transmission rate ratio, desired water vapor transmission rate, desired thickness of gas permeation layer, desired overall thickness of film, the intended use of the film, the food or other item to be packaged when the film is to be used in packaging applications, compatibility with polyethylene, and other factors.

In various embodiments, the gas permeation layer comprises polyether block amide, poly(ethylene-vinyl acetate), a propylene-based olefin block copolymer, a polyolefin plastomer, a polyolefin elastomer, or combinations thereof.

Examples of commercially available polyether block amides that can be used in a gas permeation layer in some embodiments of the present invention include Pebax polyether block amides commercially available from Arkema such as, for example Pebax 2533 SD 02. Examples of ethylene-vinyl acetate polymers (poly(ethylene-vinyl acetate)) that can be used in a gas permeation layer in some embodiments of the present invention include Elvax ethylene-vinyl acetate polymers commercially available from DuPont such as, for example, Elvax 3135 and Elvax 3190. Examples of polyolefin plastomers that can be used in a gas permeation layer in some embodiments of the present invention include AFFINITY™ and VERSIFY™ polyolefin plastomers commercially available from The Dow Chemical Company such as, for example, AFFINITY™ PL 1880G. Examples of polyolefin elastomers that can be used in a gas permeation layer in some embodiments of the present invention include ENGAGE™ polyolefin elastomers, AFFINITY polyolefin elastomers, and VERSIFY™ polyolefin elastomers commercially available from The Dow Chemical Company such as, for example, VERSIFY™ 2000. Examples of propylene-based olefin block copolymers that be used in a gas permeation layer in some embodiments of the present invention include INTUNE™ propylene-based olefin block copolymers commercially available from The Dow Chemical Company.

The thickness of Layer B can vary depending on a number of factors including, for example, the composition of Layer B (the gas permeation layer), the compositions of Layer A and Layer C, the desired thicknesses of Layers A and Layer C, the desired overall thickness of the multilayer film, the intended use of the multilayer film, the food or other item to be packaged when the film is to be used in packaging applications, and other factors. The contribution of Layer B to the overall thickness of the multilayer film can be characterized in term of weight percentage. In some embodiments, Layer B comprises at least 1% by weight of the multilayer film based on the total weight of the film. Layer B, in some embodiments, comprises at least 5% by weight of the multilayer film based on the total weight of the film. In some embodiments, Layer B comprises at least 10% by weight of the multilayer film based on the total weight of the film. In some embodiments, Layer B comprises up to 80% by weight of the multilayer film based on the total weight of the film. Layer B, in some embodiments, comprises up to 60% by weight of the multilayer film based on the total weight of the film. In some embodiments, Layer B comprises up to 40% by weight of the multilayer film based on the total weight of the film. Layer B, in some embodiments, comprises 1 to 80% by weight of the multilayer film based on the total weight of the film. In some embodiments, Layer B comprises 5 to 60% by weight of the multilayer film based on the total weight of the film. Layer B, in some embodiments, comprises 10 to 40% by weight of the multilayer film based on the total weight of the film.

Some embodiments of multilayer films of the present invention can include layers beyond those described above. For example, other layers can be provided in adhering contact with Layer A and/or Layer C. For example, a multilayer film can further comprise other layers typically included in multilayer layers depending on the application including, for example, sealant layers, tie layers, polypropylene layers, other polyethylene layers, etc. Additionally, other layers such as printed, high modulus, high gloss layers may be laminated to multilayer films of the present invention.

In some embodiments, the multilayer film can have up to 10,001 layers with each layer having opposing facial surfaces. In some embodiments, some layers in the multilayer film can have the same composition. For example, a multilayer film can be a 3 layer film with each layer having opposing facial surfaces and arranged in the order A/B/A. As another example, a multilayer film can be a 5 layer film with each layer having opposing facial surfaces and arranged in the order A/B/A/B/A. As another example, a multilayer film can be a 9 layer film with each layer having opposing facial surfaces and arranged in the order A/B/A/B/A/B/A/B/A. As another example, a multilayer film can be a 10,001 layer film with each layer having opposing facial surfaces and arranged in the order $A/B/(A/B)_n/A/B/A$, with n=4,998.

It should be understood that any of the foregoing layers can further comprise one or more additives as known to those of skill in the art such as, for example, antioxidants, ultraviolet light stabilizers, thermal stabilizers, slip agents, antiblock, pigments or colorants, processing aids, crosslinking catalysts, flame retardants, nucleating agents, fillers and foaming agents. However, as discussed in more detail below, the amount of calcium carbonate ($CaCO_3$) is generally very low, if present at all, in embodiments of the present invention.

As described below, multilayer films according to embodiments of the present invention are oriented in at least the machine direction. The orientation of the multilayer film as described herein provides a porosity to Layers A and C that permits the passage of $CO_2$, $O_2$, or other relevant gases and permits the gas permeation layer (Layer B) to control the transmission rate of $CO_2$, the transmission rate of $O_2$, and the ratio of the transmission rate of $CO_2$ to the transmission rate of $O_2$. Thus, after orientation of the multilayer film in at least the machine direction, in some embodiments, the oxygen and carbon dioxide transmission rates of Layer B are less than the oxygen and carbon dioxide transmission rates of Layer A and Layer C. A further advantage is that the particular HDPE used in Layers A and C provides the desired porosity after orientation while also maintaining their strengths such that Layers A and C provide structural support for the overall multilayer film.

Some embodiments of the present invention advantageously use minor amounts of calcium carbonate ($CaCO_3$), if any. In some embodiments, Layer A and C each comprise less than 10 weight percent $CaCO_3$ based on the total weight of the layer. Layer A and Layer C, in some embodiments, each comprise less than 5 weight percent $CaCO_3$. Layer A and Layer C each comprise less than 2 weight percent $CaCO_3$ in some embodiments. Layer and Layer C, in some embodiments, each comprise less than 1 weight percent $CaCO_3$. Layers A and C each comprise less than 0.1 weight percent $CaCO_3$ in some embodiments. In some embodiments, Layer A and Layer C do not include any $CaCO_3$.

After orientation in at least the machine direction, multilayer films of the present invention, in some embodiments, exhibit a normalized carbon dioxide transmission rate of at least 3000 $cm^3 \cdot mil/100\ in^2/day$ when measured according to ASTM F-2476 at 23° C., 0% relative humidity, and 1 atm. In some embodiments, multilayer films of the present invention exhibit a normalized carbon dioxide transmission rate of at least 4000 $cm^3 \cdot mil/100\ in^2/day$ when measured according to ASTM F-2476 at 23° C., 0% relative humidity, and 1 atm.

In some embodiments, multilayer films of the present invention exhibit a normalized carbon dioxide transmission rate of at least 5000 cm$^3$·mil/100 in$^2$/day when measured according to ASTM F-2476 at 23° C., 0% relative humidity, and 1 atm. Multilayer films of the present invention, in some embodiments, exhibit a normalized carbon dioxide transmission rate of up to 100,000 cm$^3$·mil/100 in$^2$/day when measured according to ASTM F-2476 at 23° C., 0% relative humidity, and 1 atm.

After orientation in at least the machine direction, multilayer films of the present invention, in some embodiments, exhibit a normalized oxygen transmission rate of at least 500 cm$^3$·mil/100 in$^2$/day when measured according to ASTM D3985 at 23° C., 0% relative humidity, and 1 atm. In some embodiments, multilayer films of the present invention exhibit a normalized oxygen transmission rate of at least 700 cm$^3$·mil/100 in$^2$/day when measured according to ASTM D3985 at 23° C., 0% relative humidity, and 1 atm. In some embodiments, multilayer films of the present invention exhibit a normalized oxygen transmission rate of at least 1,000 cm$^3$·mil/100 in$^2$/day when measured according to ASTM D3985 at 23° C., 0% relative humidity, and 1 atm. Multilayer films of the present invention, in some embodiments, exhibit a normalized oxygen transmission rate of up to 20,000 cm$^3$·mil/100 in$^2$/day when measured according to ASTM D3985 at 23° C., 0% relative humidity, and 1 atm.

After orientation in at least the machine direction, multilayer films of the present invention, in some embodiments, exhibit a ratio of carbon dioxide transmission rate to oxygen transmission rate of at least 4.0. In some embodiments, multilayer films of the present invention exhibit a ratio of carbon dioxide transmission rate to oxygen transmission rate of at least 5.0. In some embodiments, multilayer films of the present invention exhibit a ratio of carbon dioxide transmission rate to oxygen transmission rate of at least 7.0. Multilayer films of the present invention, in some embodiments, exhibit a ratio of carbon dioxide transmission rate to oxygen transmission rate of up to 15.

After orientation in at least the machine direction, multilayer films of the present invention, in some embodiments, exhibit a normalized water vapor transmission rate of at least 2 g·mil/100 in$^2$/day when measured with a Mocon W3/33 tester according to ASTM F-1249-06 at 38° C. and 100% relative humidity. In some embodiments, multilayer films of the present invention exhibit a normalized water vapor transmission rate of at least 5 g·mil/100 in$^2$/day when measured with a Mocon W3/33 tester according to ASTM F-1249-06 at 38° C. and 100% relative humidity. In some embodiments, multilayer films of the present invention exhibit a normalized water vapor transmission rate of at least 10 g·mil/100 in$^2$/day when measured with a Mocon W3/33 tester according to ASTM F-1249-06 at 38° C. and 100% relative humidity. In some embodiments, multilayer films of the present invention exhibit a normalized water vapor transmission rate of at least 50 g·mil/100 in$^2$/day when measured with a Mocon W3/33 tester according to ASTM F-1249-06 at 38° C. and 100% relative humidity. Multilayer films of the present invention, in some embodiments, exhibit a normalized water vapor transmission rate of up to 100 g·mil/100 in$^2$/day when measured with a Mocon W3/33 tester according to ASTM F-1249-06 at 38° C. and 100% relative humidity.

A variety of multilayer films can be formed in accordance with the teachings of the present invention. Certain combinations of resins may provide films having certain desirable properties.

A multilayer film can be formed according to any method known in the art. For example, the combinations of resins described herein may be formed into multilayer films using cast film processes, blown film processes, lamination, or other processes. In some embodiments, a multilayer film of the present invention is a blown film or a cast film. The total number of layers in such multilayer films can depend on a number of factors including, for example, the desired properties of the film, the end use application for the film, the desired polymers to be used in each layer, the desired thickness of the film, and others.

After formation, the multilayer film is annealed. The multilayer film can be annealed using any number of techniques known to those of skill in the art. In some embodiments, the multilayer film can be annealed at a temperature of 110° C. to 125° C. for 24 hours in a vacuum oven at a vacuum level of 28 inches of mercury.

After annealing, the multilayer films are oriented in at least the machine direction. The film web can be oriented in the machine direction only using techniques known to those of skill in the art, such as a tenter frame process or machine direction orientation equipment. The film is preferably oriented by cold stretching followed by hot stretching. In some embodiments, the film is cold stretched between 25% and 150% at a temperature of 25° C. at a stretch rate of 100%/second (e.g., for a 100 mm long film, the stretch rate would be 100 mm/second), where the stretch percentage is defined as:

$$\frac{\text{Total Length after Cold Stretching} - \text{Original Film Length}}{\text{Original Film Length}} \times 100\%,$$

wherein the length is the length of the film in the stretching direction.

In some embodiments, the film is cold stretched to at least 50%. After cold stretching, the film is hot stretched in the machine direction. In some embodiments, the film is hot stretched between 50% and 500% at a temperature of 70° C. to 100° C. at a stretch rate of 4%/second (e.g., for a 100 mm long film, the stretch rate would be 4 mm/second), where the stretch percentage is defined as:

$$\frac{\text{Total Length after Hot Stretching} - \text{Total Length after Cold Stretching}}{\text{Original Film Length}} \times 100\%,$$

wherein the length is the length of the film in the stretching direction.

In some embodiments, the film is hot stretched to at least 200%.

In some embodiments, the multilayer films can also be oriented in transverse direction. The film web can be oriented in the transverse direction using techniques known to those of skill in the art, such as a tenter frame process or machine direction orientation equipment. The film is preferably oriented by cold stretching followed by hot stretching. In some embodiments, the film is cold stretched between 25% and 150% at a temperature ranging from 10° C. to 50° C. at a rate of 100%/second (e.g., for a 100 mm long film, the stretch rate would be 100 mm/second), where the stretch percentage is defined as:

$$\frac{\text{Total Length after Cold Stretching} - \text{Original Film Length}}{\text{Original Film Length}} \times 100\%,$$

wherein the length is the length of the film in the stretching direction. In some embodiments, the film is cold stretched at 25° C. to at least 50%. After cold stretching, the film is hot stretched in the transverse direction. In some embodiments, the film is hot stretched between 50% and 500% at a temperature of 70° C. to 110° C. at a rate of 4%/second (e.g., for a 100 mm long film, the stretch rate would be 4 mm/second), where the stretch percentage is defined as:

$$\frac{\text{Total Length after Hot Stretching} - \text{Total Length after Cold Stretching}}{\text{Original Film Length}} \times 100\%.$$

wherein the length is the length of the film in the stretching direction. In some embodiments, the film is hot stretched to at least 200% at 100° C.

Embodiments of the present invention also provide packages formed from any of the multilayer films described herein. Examples of such packages can include flexible packages, modified atmosphere packaging, pouches, stand-up pouches, and pre-made packages or pouches. Such packages can be formed using techniques known to those of skill in the art in view of the teachings herein.

Test Methods

Unless otherwise indicated herein, the following analytical methods are used in the describing aspects of the present invention:

Density

Samples for density measurement are prepared according to ASTM D 1928. Polymer samples are pressed at 190° C. and 30,000 psi (207 MPa) for three minutes, and then at 21° C. and 207 MPa for one minute. Measurements are made within one hour of sample pressing using ASTM D792, Method B.

Melt Index

Melt indices $I_2$ (or $I_2$) and $I_{10}$ (or $I_{10}$) are measured in accordance with ASTM D-1238 at 190° C. and at 2.16 kg and 10 kg load, respectively. Their values are reported in g/10 min. "Melt flow rate" is used for polypropylene based resins and determined according to ASTM D1238 (230° C. at 2.16 kg).

Triple Detector Gel Permeation Chromatography ("Triple Detector GPC" or TDGPC)—Conventional GPC and Light Scattering GPC For the GPC techniques used herein (Conventional GPC, Light Scattering GPC, and gpcBR), a Triple Detector Gel Permeation Chromatography (3D-GPC or TDGPC) system is used. This system consists of a PolymerChar (Valencia, Spain) GPC-IR High Temperature Chromatograph, equipped with a Precision Detectors (now Agilent Technologies) 2-angle laser light scattering (LS) detector Model 2040, an IR5 infra-red detector and a 4-capillary viscometer detector from PolymerChar. Data collection is performed using PolymerChar "Instrument Control" software. The system is also equipped with an on-line solvent degassing device from Agilent Technologies (CA, USA).

The eluent from the GPC column set flows through each detector arranged in series, in the following order: IR5 detector, LS detector, then the Viscometer detector. The systematic approach for the determination of multi-detector offsets is performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log (MW and intrinsic viscosity) results from using a broad polyethylene standard, as outlined in the section on Light Scattering (LS) GPC below, in the paragraph following Equation (5).

Four 20-micron mixed-pore-size packing ("Mixed A", Agilent Technologies) are used for the separation. The PolymerChar Autosampler oven compartment is operated at 160° C. with low speed shaking for 3 hours, and the column compartment is operated at 150° C. The samples are prepared at a concentration of "2 milligrams per milliliter." The chromatographic solvent and the sample preparation solvent is 1,2,4-trichlorobenzene (TCB) containing 200 ppm of 2,6-di-tert-butyl-4methylphenol (BHT). The solvent is sparged with nitrogen. The injection volume is 200 microliters. The flow rate through the GPC is set at 1 ml/minute. Conventional GPC data and light scattering GPC data are recorded.

Conventional GPC

For Conventional GPC, the IR5 detector ("measurement sensor") is used, and the GPC column set is calibrated by running 21 narrow molecular weight distribution polystyrene standards. The molecular weight (MW) of the standards ranged from 580 g/mol to 8,400,000 g/mol, and the standards are contained in 6 "cocktail" mixtures. Each standard mixture has at least a decade of separation between individual molecular weights. The standard mixtures are purchased from Polymer Laboratories (now Agilent Technologies). The polystyrene standards are prepared at "0.025 g in 50 mL of solvent" for molecular weights equal to, or greater than, 1,000,000 g/mol, and at "0.05 g in 50 mL of solvent" for molecular weights less than 1,000,000 g/mol. The polystyrene standards are dissolved at 80° C., with gentle agitation, for 30 minutes. The narrow standards mixtures are run first, and in order of decreasing highest molecular weight component, to minimize degradation. The polystyrene standard peak molecular weights are converted to polyethylene molecular weight using Equation (1) (as described in Williams and Ward, J. Polym. Sci., Polym. Letters, 6, 621 (1968)):

$$MW_{PE} = A \times (MW_{PS})^B \quad \text{(Eq. 1)}$$

where MW is the molecular weight of polyethylene (PE) or polystyrene (PS) as marked, and B is equal to 1.0. It is known to those of ordinary skill in the art that A may be in a range of about 0.38 to about 0.44 such that the A value yields 52,000 $MW_{PE}$ for Standard Reference Materials (SRM) 1475a. Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations:

$$M_{n,cc} = \Sigma w_i / \Sigma(w_i/M_{cc,i}) \quad \text{(Eq. 2)}$$

$$M_{w,cc} = \Sigma w_i M_{cc,i} \quad \text{(Eq. 3)}$$

$$M_{z,cc} = \Sigma(w_i M_{cc,i}^2) / \Sigma(w_i M_{cc,i}) \quad \text{(Eq. 4)}$$

where $M_{n,cc}$, $M_{w,cc}$, and $M_{z,cc}$ are the number-, weight-, and z-average molecular weight obtained from the conventional calibration, respectively. $w_i$ is the weight fraction of the polyethylene molecules eluted at retention volume $V_i$. $M_{cc,i}$ is the molecular weight of the polyethylene molecules eluted at retention volume $V_i$ obtained using the conventional calibration (see Equation (1)).

With the conventional calibration, $w_i$ can be plotted against $\log_{10}(M_{cc,i})$. Weight fraction of molecules with a molecular weight of 10,000 or less is calculated as:

$$\int_{lg(M_{cc,i})=0}^{lg(M_{cc,i})=4} w_i d_{log(M_{cc,i})} \quad \text{(Eq. 5)}$$

Light Scattering (LS) GPC

For the LS GPC, a Precision Detector PDI2040 detector Model 2040 15° angle is used. The molecular weight data is obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used in the determination of the molecular weight is obtained from the mass detector (IR5) area, and the mass detector constant, derived from a suitable linear polyethylene homopolymer, or one of the polyethylene standards of known weight-average molecular weight. The calculated molecular weights are obtained using a light scattering constant, derived from one or more of the polyethylene standards mentioned below, and a refractive index concentration coefficient, dn/dc, of 0.104. Generally, the mass detector response and the light scattering constant should be determined from a linear standard with a molecular weight in excess of about 50,000 g/mole. The viscometer calibration can be accomplished using the methods described by the manufacturer, or, alternatively, by using the published values of suitable linear standards, such as Standard Reference Materials (SRM) 1475a (available from National Institute of Standards and Technology (NIST)). The chromatographic concentrations are assumed low enough to eliminate addressing 2nd viral coefficient effects (concentration effects on molecular weight).

With 3D-GPC, absolute weight-average molecular weight ("$M_{w,abs}$") and absolute z-average molecular weight ("$M_{z,abs}$") is determined using Equations (6) and (7) below, using the "peak area" method (after detector calibration relating areas to mass and mass—molecular weight product) for higher accuracy and precision. The "LS.Area" and the "Concentration.Area" are generated by the chromatograph/detectors combination.

$$M_{w,abs} = \frac{\sum C_i M_{abs,i}}{\sum C_i} = \frac{\sum LS_i}{\sum C_i} = \frac{LS.\text{Area}}{\text{Concentration.Area}} \quad \text{(Eq. 6)}$$

$$M_{z,abs} = \sum(w_i M_{abs,i}^2) / \sum(w_i M_{abs,i}) \quad \text{(Eq. 7)}$$

where $C_i$ is the concentration of the polyethylene molecules in the eluent at the retention volume $V_i$, $M_{abs,i}$ the absolute molecular weight of the polyethylene molecules at the retention volume $V_i$, $\Sigma LS_i$ (LS.Area) is the total response of the light scattering, and the $\Sigma C_i$ (Concentration.Area) is the total concentration.

For each LS profile, the x-axis (log $MW_{cc\text{-}GPC}$), where cc refers to the conventional calibration curve, is determined as follows. First, the polystyrene standards (see above) are used to calibrate the retention volume into "log $MW_{PS}$." Then, Equation (1) ($MW_{PE} = A \times (MW_{PS})^B$) is used to convert "log $MW_{PS}$" to "log $MW_{PE}$." The "log $MW_{PE}$" scale serves as the x-axis for the LS profiles of the experimental section (log $MW_{PE}$ is equated to the log MW(cc-GPC)). The y-axis for each LS profile is the LS detector response normalized by the injected sample mass. Initially, the molecular weight and intrinsic viscosity for a linear homopolymer polyethylene standard sample, such as SRM1475a or an equivalent, are determined using the conventional calibrations ("cc") for both molecular weight and intrinsic viscosity as a function of elution volume.

In the low molecular weight region of the GPC elution curve, the presence of a significant peak that is known to be caused by the presence of anti-oxidant or other additives, will cause an underestimation of the number average molecular weight (Mn) of the polymer sample, to give a overestimation of the sample polydispersity, defined as Mw/Mn, where Mw is the weight average molecular weight. The true polymer sample molecular weight distribution can therefore be calculated from the GPC elution by excluding this extra peak. This process is commonly described as the peak skim feature in data processing procedures in liquid chromatographic analyses. In this process, this additive peak is skimmed off from the GPC elution curve before the sample molecular weight calculation is performed from the GPC elution curve.

Oxygen Transmission Rate (OTR) Measurement

The oxygen transmission rate (OTR) of the films are measured with a MOCON OXTRAN 2/21 ML module according to ASTM D-3985 at 23° C., 0% relative humidity, and 1 atmosphere of pressure.

For unstretched (e.g., as cast) films, a 9 cm×10 cm rectangular specimens are cut and directly loaded in the MOCON OXTRAN 2/21 ML unit for measurement. The effective testing area is 50 cm$^2$. A test gas containing 2% oxygen and 98% nitrogen is used in order for the permeation not to exceed the detection range of the MOCON OXTRAN 2/21 ML module. The OTR of the sample is obtained according to the following formula: OTR=OTR(2%)/2%, where OTR(2%) is the film OTR obtained with the test gas containing 2% oxygen and 98% nitrogen.

For stretched films (oriented films), one specimen is cut from the center area of the stretched film and masked with adhesive aluminum foil on two sides. The effective sample area for OTR testing is 5 cm$^2$. A test gas containing 10% oxygen and 90% nitrogen is used in order for the permeation not to exceed the detection range of the MOCON OXTRAN 2/21 ML module. The OTR of the sample was obtained according to OTR=OTR(2%)/2%, where OTR(2%) is the film OTR obtained with a test gas containing 2% oxygen and 98% nitrogen.

Normalized OTR is obtained according to the following formula: Normalized OTR=OTR×Film Thickness. The average value of two replicates for each sample is reported. The upper detection limit of the MOCON OXTRAN 2/21 ML module is 6500 cc/100 in$^2$/day for the masked sample at a testing area of 5 cm$^2$ and with a test gas at 2% oxygen concentration. "NM" indicates the OTR of the film is greater than 6500 cc/100 in$^2$/day.

Carbon Dioxide Transmission Rate (CO$_2$TR) Measurement

The carbon dioxide transmission rate (CO$_2$TR) of the films is measured with a MOCON PERMATRAN-C 4/41 module according to ASTM F-2476 at 23° C., 0% relative humidity, and 1 atmosphere of pressure.

For unstretched (e.g., as cast) films, a 9 cm×10 cm rectangular specimen is cut and directly loaded in the MOCON PERMATRAN-C 4/41 module for the measurement. The effective testing area is 50 cm$^2$. A test gas containing 10% carbon dioxide and 90% nitrogen is used in order for the permeation not to exceed the detection range of the MOCON PERMATRAN-C 4/41 module. The CO$_2$TR of the sample is obtained according to CO$_2$TR=CO$_2$TR(10%)/10%, where CO$_2$TR(10%) is the film CO$_2$TR obtained with the test gas containing 10% carbon dioxide and 90% nitrogen.

For stretched films (oriented films), a specimen is cut from the center area of each stretched film and masked with adhesive aluminum foil on two sides. The effective sample area for CO$_2$TR testing is 5 cm$^2$. A test gas containing 10% carbon dioxide and 90% nitrogen is used in order for the permeation not to exceed the detection range of the MOCON PERMATRAN-C 4/41 module. The CO$_2$TR of the sample is obtained according to CO$_2$TR=CO$_2$TR(10%)/10%, where CO$_2$TR(10%) is the film CO$_2$TR obtained with a test gas containing 10% carbon dioxide and 90% nitrogen. Normalized CO$_2$TR is obtained according to the following formula: Normalized CO$_2$TR=CO$_2$TR×Film Thickness. The average value of two replicates for each sample is reported. The upper detection limit of the MOCON PERMATRAN-C 4/41 module is 51500 cc/100 in$^2$/day for the masked sample at a testing area of 5 cm$^2$ and a test gas at 10% carbon dioxide concentration. "NM" indicates the CO$_2$TR of the film is greater than 51500 cc/100 in$^2$/day.

Water Vapor Transmission Rate (WVTR) Measurement

Depending on the WVTR range of the films, the WVTR of a film is either measured with a Mocon W3/33 according to ASTM F1249-06 or with a MOCON 101K according to ASTM D6701-01.

For unstretched (e.g., as cast) films, a 9 cm×10 cm rectangular specimen is cut from the cast film. WVTR is measured with a Mocon W3/33 according to ASTM F1249-06, at 38° C., with 100% relative humidity (RH). The effective testing film area is 50 cm$^2$. The average value of two replicates for each film is reported.

For stretched films (oriented films), one specimen is cut from the center area of each stretched films and masked with adhesive aluminum foil on two sides. The effective sample area for WVTR testing is 5 cm$^2$. For lower WVTR values (i.e., less than 64.5 g/100 in$^2$/day), WVTR is measured with a Mocon W3/33 according to ASTM F1249-06, at 38° C., with 100% relative humidity (RH). For higher WVTR values (i.e., greater than 32 g/100 in$^2$/day), WVTR is measured using a MOCON 101K at 38° C. and 100% RH according to ASTM D6701-01. Normalized WVTR is obtained according to Normalized WVTR=WVTR×Film Thickness.

Additional properties and test methods are described further herein.

Some embodiments of the invention will now be described in detail in the following Examples.

EXAMPLES

A number of 3-layer films (A/B/C) are produced for evaluation. The compositions and film thicknesses of the films are shown in Table 1:

TABLE 1

| | Film Thickness | Layer A (skin) | | Layer B (core) | | Layer C (skin) | |
|---|---|---|---|---|---|---|---|
| | mil | Material | Wt % | Material | Wt % | Material | Wt % |
| Film 1 | 2.1 | UNIVAL ™ DMDA-6400 | 30 | ELVAX 3135 | 40 | UNIVAL ™ DMDA-6400 | 30 |
| Film 2 | 1.8 | UNIVAL ™ DMDA-6400 | 40 | ELVAX 3190 | 20 | UNIVAL ™ DMDA-6400 | 40 |
| Film 3 | 2.0 | UNIVAL ™ DMDA-6400 | 30 | ELVAX 3190 | 40 | UNIVAL ™ DMDA-6400 | 30 |
| Film 4 | 3.1 | UNIVAL ™ DMDA-6400 | 50 | PEBAX 2533 SD 02 | 25 | UNIVAL ™ DMDA-6400 | 25 |
| Film 5 | 2.5 | UNIVAL ™ DMDA-6400 | 30 | AFFINITY ™ PL 1880G | 40 | UNIVAL ™ DMDA-6400 | 30 |
| Film 6 | 2.2 | ELITE ™ 5960G | 30 | ELVAX 3135 | 40 | ELITE ™ 5960G | 30 |
| Film 7 | 3.1 | UNIVAL ™ DMDA-6200 | 30 | ELVAX 3135 | 40 | UNIVAL ™ DMDA-6200 | 30 |
| Film 8 | 1.9 | UNIVAL ™ DMDA-6400 | 30 | UNIVAL ™ DMDA-6400 | 40 | UNIVAL ™ DMDA-6400 | 30 |

UNIVAL ™ DMDA-6400 (density = 0.961 g/cm$^3$; I$_2$ = 0.8 g/10 minutes), UNIVAL ™ DMDA-6200 (density = 0.953 g/cm$^3$; I$_2$ = 0.38 g/10 minutes), and ELITE ™ 5960G (enhanced polyethylene with density = 0.962 g/cm$^3$; I$_2$ = 0.85 g/10 minutes) are high density polyethylenes commercially available from The Dow Chemical Company. Elvax 3135 and Elvax 3190 are ethylene vinyl acetates commercially available from DuPont. Pebax 2533 SD 02 is a polyether block amide commercially available from Arkema. AFFINITY ™ PL 1880G is a polyolefin plastomer commercially available from The Dow Chemical Company.

The high density polyethylenes used in the above films have the following additional properties:

TABLE 2

| | Conventional GPC | | | | Light Scattering GPC | | | |
|---|---|---|---|---|---|---|---|---|
| | $M_{n,cc}$ (g/mol) | $M_{z,cc}$ (g/mol) | $M_{w,cc}/M_{n,cc}$ | Weight fraction of molecules with a molecular weight of 10,000 or less | $M_{n,abs}$ (g/mol) | $M_{w,abs}$ (g/mol) | $M_{z,abs}$ (g/mol) | $M_{z,abs}/M_{w,abs}$ |
| UNIVAL ™ DMDA-6400 | 12,808 | 109,672 | 621,184 | 8.6 | 17.2 | 11,183 | 111,190 | 640,760 | 5.8 |
| ELITE ™ 5960G | 21,624 | 107,011 | 303,585 | 4.9 | 10.8 | 20,366 | 112,371 | 357,492 | 3.2 |
| UNIVAL ™ DMDA-6200 | 13,520 | 129,915 | 751,383 | 9.6 | 15.2 | 11,511 | 129,860 | 732,692 | 5.6 |

UNIVAL ™ DMDA-6400 and UNIVAL ™ DMDA-6200 each have a $M_{w,cc}/M_{n,cc}$ of at least 6.0 and a $M_{z,abs}$ of at least 500,000 grams/mol as measured by triple detector GPC.

The 3-layer films are produced using a Dr. Collin cast film line. The line was comprised of three 25:1 L/D single screw extruders, equipped with grooved feed zones. The screw diameters are 25 mm for the two skin layer extruders and 30 mm for the core layer extruder. The slit die width is 10 inches and the die gap is 20 mil. Details of the processing conditions are listed in Table 3:

TABLE 3

| | | | Film 1 | Film 2 | Film 3 | Film 4 | Film 5 | Film 6 | Film 7 | Film 8 |
|---|---|---|---|---|---|---|---|---|---|---|
| Layer A Extruder | Zone 1 Temperature | ° C. | 74 | 75 | 75 | 50 | 75 | 74 | 74 | 50 |
| | Zone 2 Temperature | ° C. | 243 | 240 | 241 | 258 | 240 | 240 | 244 | 239 |
| | Zone 3 Temperature | ° C. | 232 | 231 | 229 | 263 | 228 | 231 | 239 | 229 |
| | Zone 4 Temperature | ° C. | 225 | 225 | 225 | 264 | 225 | 225 | 237 | 225 |
| | Zone 5 Temperature | ° C. | 235 | 235 | 235 | 265 | 235 | 235 | 240 | 235 |
| | Melt Temperature | ° C. | 217 | 218 | 217 | 253 | 217 | 218 | 232 | 217 |
| | Screw Rate | rpm | 52 | 74 | 58 | 65 | 57 | 52 | 63 | 68 |
| | Motor Current | A | 1.0 | 1.4 | 1.1 | 0.8 | 1.2 | 1.4 | 1.4 | 1.0 |
| | Melt Pressure | bar | 157 | 172 | 150 | 96 | 167 | 200 | 254 | 139 |
| | Throughput Rate | kg/h | 1.497 | 2.021 | 1.477 | 1.488 | 1.504 | 1.486 | 1.519 | 1.489 |
| Layer B Extruder | Zone 1 Temperature | ° C. | 27 | 25 | 26 | 23 | 26 | 27 | 27 | 28 |
| | Zone 2 Temperature | ° C. | 230 | 198 | 200 | 150 | 217 | 230 | 231 | 240 |
| | Zone 3 Temperature | ° C. | 249 | 210 | 211 | 148 | 223 | 251 | 250 | 233 |
| | Zone 4 Temperature | ° C. | 255 | 232 | 233 | 150 | 241 | 252 | 255 | 225 |
| | Zone 5 Temperature | ° C. | 250 | 230 | 230 | 150 | 239 | 250 | 250 | 235 |
| | Zone 6 Temperature | ° C. | 250 | 230 | 230 | 150 | 239 | 250 | 250 | 240 |
| | Melt Temperature | ° C. | 229 | 210 | 212 | 135 | 223 | 229 | 229 | 219 |
| | Screw Rate | rpm | 24 | 10 | 21 | 5 | 19 | 25 | 24 | 26 |
| | Motor Current | A | 2.6 | 2.2 | 2.8 | 2.7 | 3.3 | 2.7 | 2.6 | 2.5 |
| | Melt Pressure | bar | 162 | 107 | 120 | 62 | 166 | 177 | 163 | 155 |
| | Throughput Rate | kg/h | 1.998 | 0.999 | 2.006 | 0.749 | 2.002 | 1.996 | 2.000 | 1.999 |
| Layer C Extruder | Zone 1 Temperature | ° C. | 74 | 75 | 75 | 49 | 75 | 74 | 73 | 49 |
| | Zone 2 Temperature | ° C. | 242 | 240 | 238 | 255 | 240 | 241 | 245 | 239 |
| | Zone 3 Temperature | ° C. | 228 | 228 | 231 | 266 | 227 | 229 | 236 | 228 |
| | Zone 4 Temperature | ° C. | 227 | 226 | 223 | 267 | 226 | 224 | 233 | 224 |

TABLE 3-continued

|  |  | Film 1 | Film 2 | Film 3 | Film 4 | Film 5 | Film 6 | Film 7 | Film 8 |
|---|---|---|---|---|---|---|---|---|---|
| Zone 5 Temperature | °C | 235 | 235 | 235 | 265 | 235 | 235 | 239 | 235 |
| Melt Temperature | °C | 224 | 226 | 223 | 261 | 224 | 222 | 231 | 223 |
| Screw Rate | rpm | 67 | 80 | 65 | 63 | 66 | 64 | 70 | 84 |
| Motor Current | A | 1.2 | 1.2 | 1.2 | 1.3 | 1.4 | 1.2 | 1.2 | 1.3 |
| Melt Pressure | bar | 186 | 220 | 189 | 373 | 239 | 211 | 201 | 217 |
| Throughput Rate | kg/h | 1.500 | 2.011 | 1.518 | 0.743 | 1.513 | 1.448 | 1.484 | 1.532 |
| Die Temperature | °C | 225 | 225 | 225 | 250 | 225 | 225 | 260 | 230 |
| Chill Roll Temperature | °C | 25 | 25 | 25 | 25 | 25 | 25 | 25 | 25 |

The normalized oxygen transmission rate, the normalized carbon dioxide transmission rate, and the normalized water vapor transmission rate are measured.

The oxygen transmission rates (OTR) of the films are measured with a MOCON OXTRAN 2/21 ML module according to ASTM D-3985 at 23° C., 0% relative humidity, and 1 atmosphere of pressure. For Films 1-8, 9 cm×10 cm rectangular specimens are cut from the cast films and are directly loaded in the MOCON OXTRAN 2/21 ML unit for the measurement. The effective testing area is 50 cm$^2$. A test gas containing 2% oxygen and 98% nitrogen is used in order for the permeation not to exceed the detection range of the MOCON OXTRAN 2/21 ML module. The OTR of the sample is obtained according to OTR=OTR(2%)/2%, where OTR(2%) is the film OTR obtained with the test gas containing 2% oxygen and 98% nitrogen.

Normalized OTR is obtained according to the following: Normalized OTR=OTR×Film Thickness. The average values of two replicates for each sample are reported in Table 4. The results are provided in Table 4 below.

The carbon dioxide transmission rates ($CO_2$TR) of the films are measured with a MOCON PERMATRAN-C 4/41 module according to ASTM F-2476 at 23° C., 0% relative humidity, and 1 atmosphere of pressure. For Films 1-8, 9 cm×10 cm rectangular specimens are cut from the cast films and are directly loaded in the MOCON PERMATRAN-C 4/41 module for the measurement. The effective testing area is 50 cm$^2$. A test gas containing 10% carbon dioxide and 90% nitrogen is used in order for the permeation not to exceed the detection range of the MOCON PERMATRAN-C 4/41 module. The $CO_2$TR of the sample is obtained according to $CO_2$TR=$CO_2$TR(10%)/10%, where $CO_2$TR(10%) is the film $CO_2$TR obtained with the test gas containing 10% carbon dioxide and 90% nitrogen.

Normalized $CO_2$TR is obtained according to the following formula: Normalized $CO_2$TR=$CO_2$TR×Film Thickness. The average value of two replicates for each sample is reported. The results are provided in Table 4 below.

The ratio of $CO_2$TR/OTR is calculated by dividing the Normalized $CO_2$TR by the Normalized OTR. The results are provided in Table 4 below.

For Films 1-8, 9 cm×10 cm rectangular specimens are cut from the cast films. WVTR is measured with a Mocon W3/33 according to ASTM F1249-06, at 38° C., with 100% relative humidity (RH). The effective testing film area is 50 cm$^2$. The average value of two replicates for each film is reported. The WVTR results are shown in Table 4 below.

TABLE 4

|  | Normalized OTR cc*mil/100 in$^2$*day | Normalized $CO_2$TR cc*mil/100 in$^2$*day | $CO_2$TR/ OTR | Normalized WVTR* g*mil/100 in$^2$*day |
|---|---|---|---|---|
| Film 1 | 522 | 2623 | 5.0 | 1.28[a] |
| Film 2 | 376 | 2020 | 5.4 | 0.74[a] |
| Film 3 | 507 | 2746 | 5.4 | 1.13[a] |
| Film 4 | 847 | 4058 | 4.8 | 1.35[a] |
| Film 5 | 445 | 2369 | 5.3 | 0.86[a] |
| Film 6 | 464 | 2221 | 4.8 | 0.91[a] |
| Film 7 | 565 | 2814 | 5.0 | 1.21[a] |
| Film 8 | 331 | 1678 | 5.1 | 0.67[a] |

*[a] indicates the WVTR was measured with a Mocon W3/33 according to ASTM F1249-06.

Films 1-8 are annealed at a predetermined temperature (indicated in Table 5 below) in a vacuum oven (Precision Scientific, CR-00643) under a vacuum level of 28 inch Hg for 24 hours.

After annealing, each film is cut into pieces with a dimension of 5" (machine direction, MD)×6" (transverse direction, TD). Metal shims are attached to both edges of the film along the machine direction using a tape. The metal shims are used to allow the stretching force to be uniformly distributed across the film width. The film with metal shims is then loaded onto the grids of an Iwamoto biaxial stretcher. The initial film length of each film before stretching is 100 mm. The film is subjected to cold stretching by 50%, which is defined by $$\frac{\text{Total Length after Cold Stretching} - \text{Initial Film Length}}{\text{Initial Film Length}} \times 100\%,$$

at a rate of 100 mm/s (100%/second, considering the original length of film of 100 mm). After that, the door of the sample chamber is closed, and the sample chamber is heated to 100° C., followed by holding at this temperature for 1 minute. Subsequently, the film is subjected to hot stretching by 200% (or 50% for Inventive 5), which is defined by $$\frac{\text{Total Length after Hot Stretching} - \text{Total Length after Cold Stretching}}{\text{Initial Film Length}} \times 100\%,$$

for solid films at a rate of 4 mm/s (4%/second, considering the original length of film of 100 mm). These processing conditions are summarized below:

TABLE 5

| Example | Film Designation Before Stretch | Annealed Temperature for 24 hours ° C. | Cold Stretch Temperature ° C. | Cold Stretch Percentage @ 100 mm/s % | Hot Stretch Temperature ° C. | Hot Stretch Percentage @ 4 mm/s % |
|---|---|---|---|---|---|---|
| Inventive 1 | Film 1 | 120 | 25 | 50 | 100 | 200 |
| Inventive 2 | Film 2 | 120 | 25 | 50 | 100 | 200 |
| Inventive 3 | Film 3 | 120 | 25 | 50 | 100 | 200 |
| Inventive 4 | Film 4 | 120 | 25 | 50 | 70 | 50 |
| Inventive 5 | Film 5 | 120 | 25 | 50 | 100 | 200 |
| Comparative 1 | Film 6 | 120 | 25 | 50 | 100 | 200 |
| Comparative 2 | Film 7 | 115 | 25 | 50 | 95 | 200 |
| Comparative 3 | Film 8 | 120 | 25 | 50 | 100 | 200 |

The normalized oxygen transmission rate, the normalized carbon dioxide transmission rate, and the normalized water vapor transmission rate are measured.

The oxygen transmission rates (OTR) of the films are measured with a MOCON OXTRAN 2/21 ML module according to ASTM D-3985 at 23° C., 0% relative humidity, and 1 atmosphere of pressure. One specimen is cut from the center area of each stretched film and masked with adhesive aluminum foil on two sides. The effective sample area for OTR testing is 5 cm$^2$. A test gas containing 10% oxygen and 90% nitrogen is used in order for the permeation not to exceed the detection range of the MOCON OXTRAN 2/21 ML module. The OTR of the sample is obtained according to OTR=OTR(2%)/2%, where OTR(2%) is the film OTR obtained with a test gas containing 2% oxygen and 98% nitrogen. Normalized OTR is obtained according to the following: Normalized OTR=OTR×Film Thickness. The upper detection limit of the MOCON OXTRAN 2/21 ML module is 6500 cc/100 in$^2$/day for the masked sample at a testing area of 5 cm$^2$ and with a test gas at 2% oxygen concentration. "NM" indicates the OTR of the film is greater than 6500 cc/100 in$^2$/day. The results are provided in Table 6 below.

The carbon dioxide transmission rates (CO$_2$TR) of the films are measured with a MOCON PERMATRAN-C 4/41 module according to ASTM F-2476 at 23° C., 0% relative humidity, and 1 atmosphere of pressure. A specimen is cut from the center area of each stretched film and masked with adhesive aluminum foil on two sides. The effective sample area for CO$_2$TR testing is 5 cm$^2$. A test gas containing 10% carbon dioxide and 90% nitrogen is used in order for the permeation not to exceed the detection range of the MOCON PERMATRAN-C 4/41 module. The CO$_2$TR of the sample is obtained according to CO$_2$TR=CO$_2$TR(10%)/10%, where CO$_2$TR(10%) is the film CO$_2$TR obtained with a test gas containing 10% carbon dioxide and 90% nitrogen. Normalized CO$_2$TR is obtained according to the following formula: Normalized CO$_2$TR=CO$_2$TR×Film Thickness. The average value of two replicates for each sample is reported. The upper detection limit of the MOCON PERMATRAN-C 4/41 module is 51500 cc/100 in$^2$/day for the masked sample at a testing area of 5 cm$^2$ and a test gas at 10% carbon dioxide concentration. "NM" indicates the CO$_2$TR of the film is greater than 51500 cc/100 in$^2$/day. The results are provided in Table 6 below.

The ratio of CO$_2$TR/OTR is calculated by dividing the Normalized CO$_2$TR by the Normalized OTR. The results are provided in Table 6 below.

For Inventive Examples 1-5 and Comparative Examples 1-2, a specimen is cut from the center area of each stretched films and masked with adhesive aluminum foil on two sides. The effective sample area for WVTR testing is 5 cm$^2$. WVTR was then measured with a Mocon W3/33 according to ASTM F1249-06, at 38° C., with 100% relative humidity (RH).

The WVTR of Comparative Example 3 is tested using a MOCON 101K at 38° C. and 100% relative humidity according to ASTM D6701-01. One specimen is cut from the center area of the stretched film. The lower detection limit for MOCON 101K is 32 g/(inch$^2$·day).

The Normalized WVTR is obtained according to Normalized WVTR=WVTR×Film Thickness. The average value of two replicates for each sample are reported in Table 6.

TABLE 6

| Example | Thickness mil | Normalized OTR cc*mil/ 100 in$^2$*day | Normalized CO$_2$TR cc*mil/ 100 in$^2$*day | CO$_2$TR/ OTR | Normalized WVTR* g*mil/ 100 in$^2$*day |
|---|---|---|---|---|---|
| Inventive 1 | 0.9 | 759 | 3844 | 5.1 | 2.54[a] |
| Inventive 2 | 1.1 | 861 | 4047 | 4.7 | 2.11[a] |
| Inventive 3 | 1.6 | 1376 | 6035 | 4.4 | 4.48[a] |
| Inventive 4 | 1.6 | 5492 | 40980 | 7.5 | 61.8[a] |
| Inventive 5 | 0.6 | 1747 | 7333 | 4.2 | 2.30[a] |
| Comparative 1 | 0.9 | 221 | 1101 | 5.0 | 1.16[a] |
| Comparative 2 | 2.3 | 853 | 2589 | 3.0 | 2.70[a] |
| Comparative 3 | 0.8 | NM* | NM* | N/A | 332[b] |

*[a]indicates the WVTR was measured with a Mocon W3/33 according to ASTM F1249-06
[b]indicates the WVTR was measured with a MOCON 101K according to ASTM D6701-01
"NM" indicates the OTR and CO2TR of the film are too high to be measured by the MOCON OXTRAN 2/21 ML module and the MOCON PERMTRAN 4/41 ML module.

That which is claimed is:

1. A multilayer film comprising at least 3 layers A, B, and C, each layer having opposing facial surfaces and arranged in the order A/B/C, wherein:
    Layer A comprises a high density polyethylene having a $M_{w,cc}/M_{n,cc}$ of at least 6.0, a $M_{z,abs}$ of at least 500,000 grams/mol as measured by triple detector GPC, and a density of 0.957-0.970 g/cm³, wherein the high density polyethylene comprises at least 90 percent by weight of Layer A;
    Layer B comprises a gas permeation layer, wherein a top facial surface of Layer B is in adhering contact with a bottom facial surface of Layer A, wherein the gas permeation layer comprises polyether block amide, poly(ethylene-vinyl acetate), a propylene-based olefin block copolymer, a polyolefin plastomer, a polyolefin elastomer, or combinations thereof; and
    Layer C comprises a high density polyethylene having a $M_{w,cc}/M_{n,cc}$ of at least 6.0, a $M_{z,abs}$ of at least 500,000 grams/mol as measured by triple detector GPC, and a density of 0.957-0.970 g/cm³, wherein the high density polyethylene comprises at least 90 percent by weight of Layer C and wherein a top facial surface of Layer C is in adhering contact with a bottom facial surface of Layer B,
    wherein the film is oriented in the machine direction and wherein the film exhibits a normalized carbon dioxide transmission rate of at least 3000 cm³·mil/100 in²/day when measured according to ASTM F-2476 at 23° C., 0% relative humidity, and 1 atm, and wherein the film exhibits a ratio of the carbon dioxide transmission rate to an oxygen transmission rate of at least 4.0, when the oxygen transmission rate is measured according to ASTM D3985 at 23° C., 0% relative humidity, and 1 atm.

2. The multilayer film of claim 1, wherein the oxygen and carbon dioxide transmission rates of Layer B are less than the oxygen and carbon dioxide transmission rates of Layer A and Layer C.

3. The multilayer film of claim 1, wherein the film is cold stretched in the machine direction, and after the cold stretch, the film is hot stretched in the machine direction.

4. The multilayer film of claim 1, wherein the film is cold stretched in the transverse direction, and after the cold stretch, the film is hot stretched in the transverse direction.

5. The multilayer film of claim 3, wherein the cold stretch percentage:

$$\frac{\text{Total Length after Cold Stretching} - \text{Original Film Length}}{\text{Original Film Length}} \times 100\%,$$

is from 25% to 150%, wherein the cold stretch is performed at a temperature ranging from 10° C. to 50° C.

6. The multilayer film of claim 3, wherein the hot stretch percentage:

$$\frac{\text{Total Length after Hot Stretching} - \text{Total Length after Cold Stretching}}{\text{Original Film Length}} \times 100\%,$$

is from 50% to 500%, wherein the hot stretch is performed at a temperature ranging from 90° C. to 110° C.

7. The multilayer film of claim 1, wherein Layer A comprises at least 10% by weight of the multilayer film based on the total weight of the film, and wherein Layer C comprises at least 10% by weight of the multilayer film based on the total weight of the film.

8. The multilayer film of claim 1, wherein Layer A and Layer C each comprise less than 10 weight percent $CaCO_3$.

9. The multilayer film of claim 1, wherein the ratio of carbon dioxide transmission rate to oxygen transmission rate is greater than 5.

10. The multilayer film of claim 1, wherein Layer A and Layer C have the same composition.

11. The multilayer film of claim 1, further comprising Layer D and Layer E, wherein a top facial surface of Layer D is in adhering contact with a bottom facial surface of Layer C, wherein a top facial surface of Layer E is in adhering contact with a bottom facial surface of Layer D, wherein Layer D comprises a gas permeation layer, and wherein Layer E has the same composition has Layer A.

12. The multilayer film of claim 11, wherein Layers B and D have the same composition.

13. A package comprising the multilayer film of claim 1.

14. A method of manufacturing a multilayer film, the method comprising:
    providing a film comprising at least 3 layers, A, B, and C, each layer having opposing facial surfaces and arranged in the order A/B/C, wherein Layer A comprises a high density polyethylene having a $M_{w,cc}/M_{n,cc}$ of at least 6.0, a $M_{z,abs}$ of at least 500,000 grams/mol as measured by triple detector GPC, and a density of 0.957-0.970 g/cm³, wherein the high density polyethylene comprises at least 90 percent by weight of Layer A; Layer B comprises a gas permeation layer, wherein a top facial surface of Layer B is in adhering contact with a bottom facial surface of Layer A, wherein the gas permeation layer comprises polyether block amide, poly(ethylene-vinyl acetate), a propylene-based olefin block copolymer, a polyolefin plastomer, a polyolefin elastomer, or combinations thereof; and layer C comprises a high density polyethylene having a $M_{w,cc}/M_{n,cc}$ of at least 6.0, a $M_{z,abs}$ of at least 500,000 grams/mol as measured by triple detector GPC, and a density of 0.957-0.970 g/cm³, wherein the high density polyethylene comprises at least 90 percent by weight of Layer C and wherein a top facial surface of Layer C is in adhering contact with a bottom facial surface of Layer B;
    cold stretching the film in the machine direction to a cold stretch percentage, $$\frac{\text{Total Length after Cold Stretching} - \text{Original Film Length}}{\text{Original Film Length}} \times 100\%,$$

of from 25% to 150% at a temperature ranging from 10° C. to 50° C.; and after the cold stretch, hot stretching the film in the machine direction to a hot stretch percentage, $$\frac{\text{Total Length after Hot Stretching} - \text{Total Length after Cold Stretching}}{\text{Original Film Length}} \times 100\%,$$

of from 50% to 500% at a temperature ranging from 90° C. to 110° C., wherein the film exhibits a normalized carbon dioxide transmission rate of at least 3000 cm³·mil/100 in²/day when measured according to ASTM F-2476 at 23° C., 0% relative humidity, and 1 atm, and wherein the film exhibits a ratio of the carbon dioxide transmission rate to an oxygen transmission rate of at least 4.0, when the oxygen transmission rate is measured according to ASTM D3985 at 23° C., 0% relative humidity, and 1 atm.

* * * * *